UNITED STATES PATENT OFFICE.

RICHARD WILLSTÄTTER, OF BERLIN, GERMANY.

PHOSPHORUS AND OXYGEN CONTAINING ORGANIC COMPOUNDS.

1,205,138.  Specification of Letters Patent.  Patented Nov. 14, 1916.

No Drawing.  Application filed April 16, 1915. Serial No. 21,859.

*To all whom it may concern:*

Be it known that I, RICHARD WILLSTÄTTER, professor of chemistry, doctor of philosophy, citizen of the German Empire, residing at Berlin, Germany, have invented new and useful Improvements in Phosphorus and Oxygen Containing Organic Compounds, of which the following is a specification.

It has been found that new and valuable products can be obtained by treating unsaturated organic compounds with phosphorus and oxygen or gases containing oxygen, such as air. By this treatment $P_2O_3$ or $P_2O_4$ attaches itself to the double bond of the unsaturated compound. For this purpose the latter are dissolved in a suitable solvent e. g. benzene, cyclohexane, $CS_2$ and reacted upon by phosphorus and oxygen or air.

One can start from unsaturated compounds of many different kinds, e. g. ethylene derivatives of different series e. g. the homologues of ethylene (i. e. alkylenes or olefins), such as amylene, the unsaturated aliphatic alcohols and aldehydes e. g. allyl alcohol, geraniol, citral, unsaturated acids and their derivatives e. g. oleic acid, esters of oleic acid, olive oil, poppy oil, arylated olefins e. g. cinnamic acid, cycloolefins, e. g. tetrahydrobenzene, pinene, limonene, menthene. According to the conditions of the reaction 2 atoms of phosphorus and 3 or 4 atoms of oxygen are attached to the double bond of the hydrocarbon used. The phosphorus is present in an incompletely oxidized state, that is, it is capable of combining with at least one more oxygen atom without changing its connection with the organic radical. Allyl alcohol takes up 4 atoms of phosphorus and 6 atoms of oxygen. On using unsaturated glycerids containing several double bonds to each up to $P_2O_4$ can be attached.

The new products are solid compounds. Some of them are crystalline. They are insoluble in ether, soluble in water with decomposition. They are oxidized by nitric acid, phosphoric acid and phosphoric acids substituted by organic radicals being obtained. The new compounds possess valuable therapeutic properties.

In order to illustrate the new process more fully the following examples are given:—

(1.) Into a mixture of 70 parts by weight of amylene and 450 parts by weight of benzene, 62 parts by weight of phosphorus are introduced. Into this mixture which has to be shaken and cooled a current of oxygen is conducted from a gasometer until after the consumption of 36300 parts by volume the rapidity of the absorption diminishes. The new phosphorus containing compound which is insoluble in the above-mentioned diluent is filtered off in a nitrogen atmosphere and washed with benzene, ether and petrol ether. The phosphorite of amylene thus produced is a whitish product insoluble in ether which has most probably the formula: $C_5H_{10}P_2O_3$.

(2.) The suspension of 62 parts by weight of phosphorus in a solution of 136 parts by weight of pinene in 600 parts by weight of petrol ether which has to be well cooled is shaken in an atmosphere of oxygen until saturation. After 48400 parts by volume of the oxygen have been absorbed the reaction is complete, the phosphorate of pinene thus produced has most probably the formula: $C_{10}H_{16}P_2O_4$.

The substances produced according to the above examples may be referred to generically as poly(oxyphosphor)-substituted hydrocarbons, this expression being applicable irrespective of whether the phosphorus is connected to carbon directly or through an intermediate oxygen atom.

(3.) 20.2 parts by weight of phosphorus are heated in an autoclave together with 100 parts by weight of olive oil (iodin absorption 82.8) until the phosphorus is molten. Then it is finely divided in the liquid by shaking the autoclave and into the cold mixture which has to be shaken with 15700 parts by volume of oxygen (at a temperature of 18° C. under a pressure of 750 mm.) are introduced. The quantitatively separated phosphorate is a caoutchouc like amber colored mass possessing a faint odor.

(4.) 3 parts by weight of poppy oil (iodin absorption 136) are stirred together with one part of finely divided phosphorus. Through the resulting suspension a rapid current of dried air heated to 40° C. is led until the whole mass is solid. The phosphorate is triturated with benzene and washed with petrol ether. The resulting compound is a brownish-yellow amorphous powder.

The pharmacological properties of these new substances are such as to make them of value in rachitic diseases, osteomalacia and in epilepsy. They might also be used to improve nutrition and to strengthen nerves.

For the purpose of this patent it is to be assumed that any product which may be obtained by treating an unsaturated organic compound with phosphorus and oxygen or gases containing oxygen, such as air, is within the class designated in this patent as phosphorites or phosphorates, such being in accordance with the present understanding as a chemist and such being the intended generic scope of this patent.

I claim:—

1. As new products phosphorus and oxygen containing compounds which can be obtained from unsaturated organic substances, phosphorus and oxygen, which products are generally insoluble in ether, soluble in water with decomposition, being oxidized by nitric acid to phosphoric acid and phosphoric acids substituted by organic radicals and possessing valuable therapeutic properties.

2. As new products, organic substances, the molecules of which contain at least two atoms of incompletely oxidized phosphorus attached to oxygen, which substances are insoluble in ether and soluble in water with decomposition.

3. As new products, organic substances which contain oxygen attached to at least two atoms of incompletely oxidized phosphorus, two atoms of phosphorus being connected to the same organic radical, which substances are insoluble in ether and possess valuable therapeutic properties.

4. As new products, organic substances containing phosphorus and oxygen, the ratio of oxygen atoms to phosphorus atoms being at the most two to one, said substances being insoluble in ether and being oxidized by nitric acid to phosphoric acid and phosphoric acids substituted by organic radicals.

5. As a new product, an aliphatic compound containing mutually attached carbon atoms and having one phosphorus atom and at least one oxygen atom connected without intervening carbon atoms to each of two adjacent carbon atoms, the ratio of said oxygen atoms to said phosphorus atoms being at the most two to one.

6. As a new product, a poly(oxyphosphor)-substituted hydrocarbon, the ratio of oxygen atoms to phosphorus atoms being at the most two to one.

7. As a new product, a poly(oxyphosphor)-substituted hydrocarbon, the phosphorus being further oxidizable without its connection to the hydrocarbon radical being changed, said product being insoluble in ether.

8. As a new product, a substituted hydrocarbon containing at least two carbon atoms and having one phosphorus atom and at least one oxygen atom connected without intervening carbon atoms to each of two adjacent carbon atoms, the ratio of said oxygen atoms to said phosphorus atoms being at the most two to one.

9. The herein described amylene phosphorite being a whitish product insoluble in ether; having most probably the formula: $C_5H_{10}P_2O_3$; and possessing valuable therapeutic properties.

In testimony whereof I have hereunto set my hand in the presence of two subscribing witnesses.

RICHARD WILLSTÄTTER.

Witnesses:
 WALDEMAR HAUPT,
 HENRY HASPER.